(12) United States Patent
Tschirhart (10) Patent No.: US 8,099,209 B2
(45) Date of Patent: Jan. 17, 2012

(54) MULTI-DIMENSIONAL CONTROLS INTEGRATION

(75) Inventor: Michael D. Tschirhart, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 840 days.

(21) Appl. No.: 12/138,865

(22) Filed: Jun. 13, 2008

(65) Prior Publication Data

US 2009/0312900 A1    Dec. 17, 2009

(51) Int. Cl.
    *G06F 7/00* (2006.01)
(52) U.S. Cl. .......................................................... 701/36
(58) Field of Classification Search ...................... 701/36
    See application file for complete search history.

(56) References Cited

U.S. PATENT DOCUMENTS

| | | | |
|---|---|---|---|
| 4,731,769 A * | 3/1988 | Schaefer et al. ................... 369/6 |
| 5,594,222 A * | 1/1997 | Caldwell ........................ 200/600 |
| 5,983,146 A * | 11/1999 | Sarbach ........................... 701/36 |
| 6,061,446 A * | 5/2000 | Lester et al. ............... 379/428.01 |
| 6,198,475 B1 * | 3/2001 | Kunimatsu et al. ........... 345/173 |
| 6,819,990 B2 * | 11/2004 | Ichinose ........................... 701/36 |
| 6,859,687 B2 * | 2/2005 | Obradovich et al. ............. 701/1 |
| 7,017,409 B2 | 3/2006 | Zielinski et al. |
| 7,098,414 B2 | 8/2006 | Caldwell |
| 7,129,933 B1 * | 10/2006 | Nishikawa et al. ........... 345/173 |
| 7,136,051 B2 * | 11/2006 | Hein et al. ..................... 345/173 |
| 7,138,984 B1 | 11/2006 | Miles |
| 7,142,189 B2 | 11/2006 | Engelmann |
| 7,279,647 B2 * | 10/2007 | Philipp ......................... 200/5 R |
| 7,466,843 B2 * | 12/2008 | Pryor ............................. 382/103 |
| 7,680,574 B2 * | 3/2010 | Berg et al. ........................ 701/41 |
| 7,898,531 B2 * | 3/2011 | Bowden et al. ............... 345/173 |
| 2003/0121767 A1 * | 7/2003 | Caldwell ........................ 200/512 |
| 2005/0116818 A1 * | 6/2005 | Kennedy et al. .............. 340/500 |
| 2005/0134559 A1 | 6/2005 | Hein et al. |
| 2006/0038793 A1 | 2/2006 | Philipp |
| 2006/0055672 A1 | 3/2006 | Krocker et al. |
| 2006/0061125 A1 | 3/2006 | Schmidt et al. |
| 2006/0256087 A1 | 11/2006 | Au et al. |
| 2008/0004769 A1 * | 1/2008 | Lenneman et al. .............. 701/36 |
| 2008/0129707 A1 * | 6/2008 | Pryor ............................. 345/175 |
| 2008/0202912 A1 * | 8/2008 | Boddie et al. .................. 200/600 |
| 2009/0273575 A1 * | 11/2009 | Pryor ............................. 345/173 |

FOREIGN PATENT DOCUMENTS

DE    102006013044 A1  * 10/2007

* cited by examiner

*Primary Examiner* — Paul N Dickson
*Assistant Examiner* — Nicole Verley
(74) *Attorney, Agent, or Firm* — Brinks Hofer Gilson & Lione (57) ABSTRACT

A multi-dimensional control system for simultaneously controlling multiple device functions in a motor vehicle is disclosed. The system includes a control panel having a control surface and an input device that is selectable at a plurality of positions about the control surface. Each of the positions is associated with one of a plurality of first function settings and one of a plurality of second function settings. Additional devices, systems, and methods for controlling multiple functions in a motor vehicle are disclosed.

18 Claims, 6 Drawing Sheets

| a | a+b | b | b+c | c | c+d | d |
|---|---|---|---|---|---|---|
| a+e | a+b+e+f | b+f | b+c+f+g | c+g | c+d+g+h | d+h |
| e | e+f | f | f+g | g | g+h | h |

Fig. 5B

MULTI-DIMENSIONAL CONTROLS INTEGRATION

TECHNICAL FIELD

The present invention relates generally to devices, systems, and methods for controlling multiple device functions in a motor vehicle.

BACKGROUND

Motor vehicles, for example automobiles, have a variety of controlled devices. For example, a typical automotive climate control system is made up of compressors, fans, temperature control devices, and venting devices. These devices work together to control the interior climate of the automobile and may be controlled directly, by the vehicle occupants, and/or indirectly using an onboard computer, for example. Examples of vehicle output devices that are typically directly controlled include, but are not limited to, fans, venting devices, interior and exterior lights, seat positioning devices, audio/video equipment, and navigation equipment.

Automobiles currently have numerous control panels disposed throughout the interior of the vehicle. A typical control panel comprises numerous mechanical and/or electronic controls such as toggle switches, rotary dials, push buttons, and touch screens. Each control is capable of adjusting only a single output function at a time. For example, in a typical automotive climate control system, the HVAC fan speed, vent configuration, and baffle configuration are controlled independently, by separate controls. Such controls are termed "one-dimensional" because they are only capable of controlling a single output device or function at a time.

Consumer demand is resulting in an increase in the number of user-controlled devices and systems in automobiles. As the number of these devices increases, the number of segregated controls is increasing, cluttering the vehicle interior. Consequently, vehicle control panels are becoming more complex and less intuitive which can be distracting to the driver and may negatively impact user satisfaction. The inventor has discovered a solution to these and other problems by consolidating multiple functions into a fewer number of controls. Such consolidated controls are capable of controlling multiple output devices simultaneously.

BRIEF SUMMARY OF THE INVENTION

According to one aspect of the invention, a multi-dimensional control system may be provided for simultaneously controlling multiple functions in a motor vehicle. The system comprises a control panel having a control surface and an input device that is selectable at a plurality of positions about the control surface. Each of the selection positions is associated with at least one of a plurality of first function settings and at least one of a plurality of second function settings. The control panel outputs the first and second function settings simultaneously. Thus, in contrast with one-dimensional controls that are capable of controlling only one function at a time, the multi-dimensional control system is capable of controlling multiple functions at the same time.

The system may further comprise at least one output device that performs the first and second functions and that is in electronic communication with the control panel. In one example, a multi-dimensional control system may be provided for controlling fan speed and vent configuration in an HVAC and include a control panel, as described above, and fan and vent control devices in electronic communication with the control panel.

In some examples, the associated first function settings may vary in a first dimension of the control surface (for example, in the x-dimension in an x-y coordinate system) and the associated second function settings may vary in a second dimension of the control surface (for example, in the y-dimension). The input device may be selectable at an m×n number of positions in a system where the first function comprises an m number of settings and the second function has an n number of settings. In alternative examples, the input device may be selectable at a fewer or a greater number of positions.

The input device may comprise any conventional or advanced control hardware. For example, the input device may comprise a plurality of proximity sensors. In some examples, each selectable position on the control surface may be associated with a separate proximity sensor. In other examples, at least one selectable position on the control surface may be associated with two or more proximity sensors.

In a presently preferred example, an HVAC control panel comprises a control surface and an input device selectable at a plurality of positions about the control surface. Each of the positions is associated with a fan speed setting and a vent configuration setting. When a selection is made, the control panel outputs the settings associated with the selected position on the control surface to fan and vent control devices simultaneously. The associated settings for the fan vary in the x-dimension of the control surface and the associated settings for the vent control device vary in the y-dimension of the control surface.

According to another aspect of the invention, a multi-dimensional control system for simultaneously controlling multiple functions in a motor vehicle comprises a control panel and an input device having a plurality of selectable control inputs arranged about a control surface of the control panel. Each of the control inputs is associated with at least one of a plurality of first function settings and at least one of a plurality of second function settings. When a user makes a control input selection, the control panel outputs the first and second function settings simultaneously.

Other features and examples are disclosed throughout the specification and in the accompanying drawings.

BRIEF DESCRIPTION OF THE DRAWINGS

FIG. 5b illustrates a sensor control strategy for the control panel depicted in FIG. 5a.

DETAILED DESCRIPTION OF THE INVENTION

The present invention relates generally to devices, systems, and methods for controlling multiple device functions in a motor vehicle. Indications are given throughout the specification to preferred and alternative embodiments of the invention, including the application of various aspects of the invention to an automotive climate control system. It should, however, be understood that the following detailed description is illustrative, rather than limiting, and that the invention is not limited to these applications.

Figure 1:
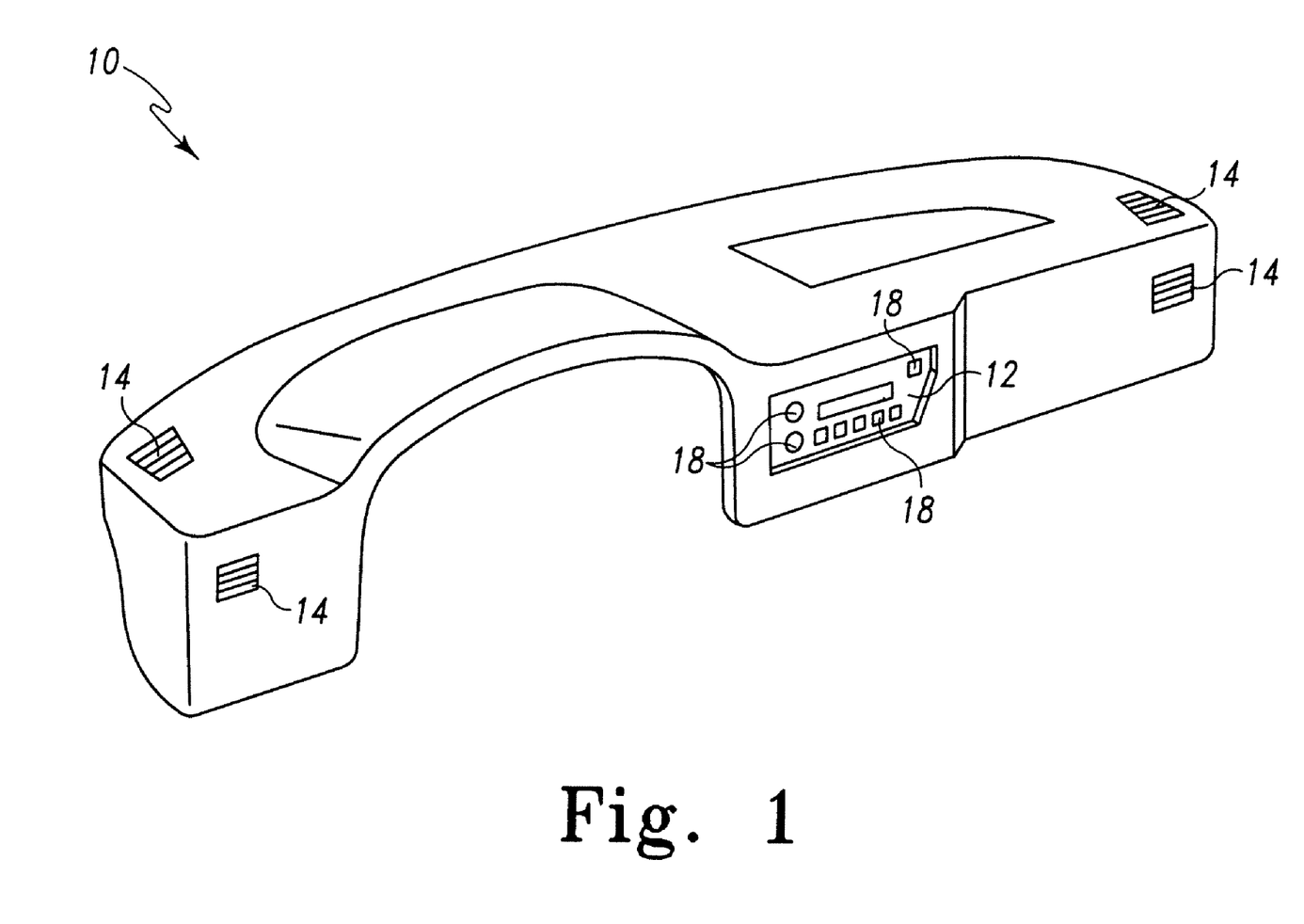
FIG. 1 is a perspective view of an automotive instrument panel.

FIG. 1 is a perspective view of an automotive instrument panel 10. The instrument panel 10 houses numerous devices such as radios, navigation systems, and HVAC equipment. Each of these devices has one or more functions that may be directly controlled by the vehicle occupants via one or more controls 18 located on control panels 12 disposed throughout the vehicle. For example, the center-stack area of the instrument typically comprises an HVAC control panel with controls for adjusting the fan speed, temperature, and air flow within the interior of the vehicle.

Figure 2A:
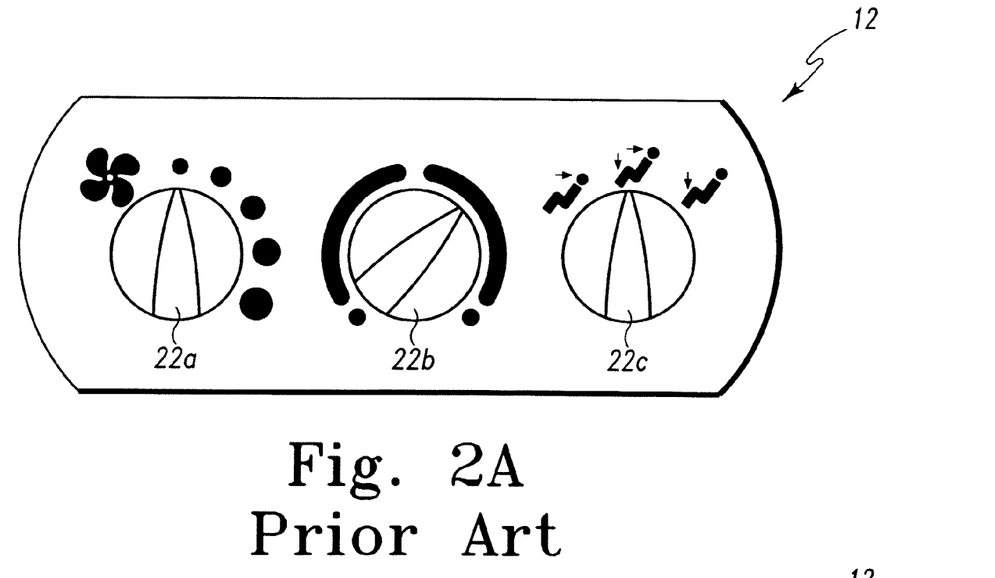
FIGS. 2A and 2B depict prior art HVAC control panels.

FIGS. 2A and 2B depict several prior art HVAC control panels 12. In FIG. 2A, the fan speed, temperature, and venting functions are each manually controlled using separate rotary or dial-type control devices 22a, 22b, 22c. Dial 22a is associated with a plurality of fan speed settings and, when rotated, selectively increases or decreases the strength of the air flow from the vents 14. Dial 22b is associated with a plurality of temperature settings and, when rotated, selectively adjusts the temperature of the air flowing from the vents 14. Dial 22c is associated with a plurality of vent configurations and, when rotated, selectively opens and closes one or more vents 14 to adjust the airflow distribution within the vehicle. Each dial 22a, 22b, 22c is a one-dimensional control and controls only a single function at a time (i.e., fan speed, temperature, or vent configuration). To adjust any combination of the fan speed, temperature, and vent configuration, the vehicle occupant must manipulate two or more dials.

Figure 2B:
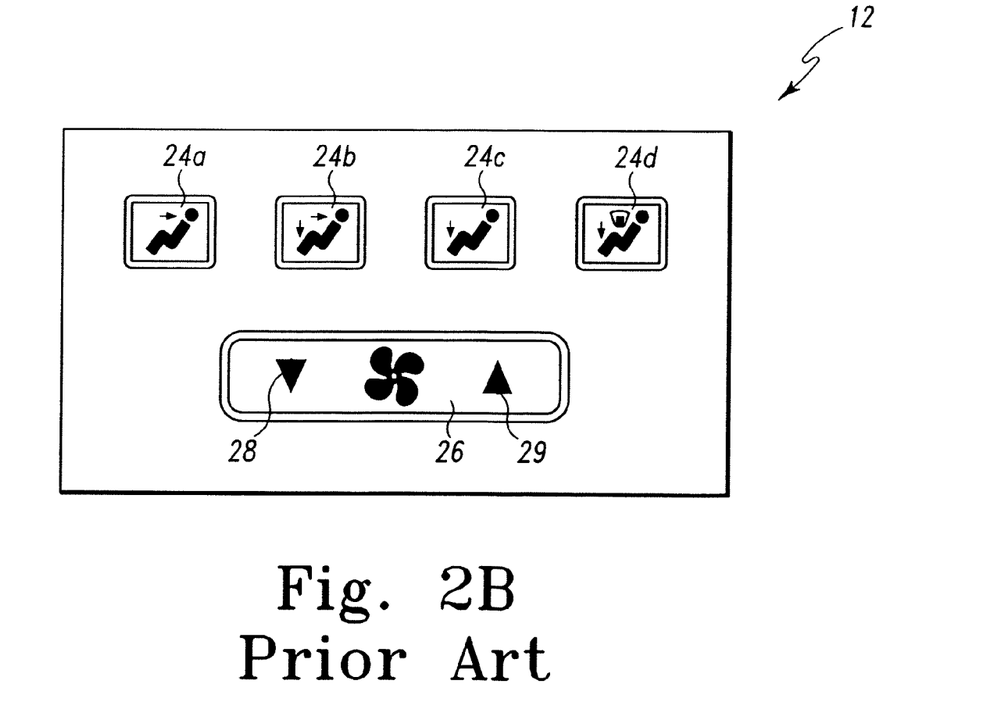

FIG. 2B depicts an example of a control panel with push-type controls 24a, 24b, 24c, 24d, 26 for adjusting the fan speed and vent configuration. Buttons 24a, 24b, 24c, 24d are each associated with a distinct vent configuration setting. To select a vent configuration, the user must depress one of these buttons 24a, 24b, 24c, 26d. Toggle 26 is associated with a plurality of fan speed settings. To increase or decrease the fan speed, the user must depress one of the toggle portions 28, 30 (represented by a down-arrow or up-arrow) one or more times to effect the desired fan speed. Each of the buttons 24a, 24b, 24c, 24d, 26 is a one-dimensional control and, therefore, is capable of controlling only a single function (i.e., fan speed or vent configuration) at a time.

Figure 3A:
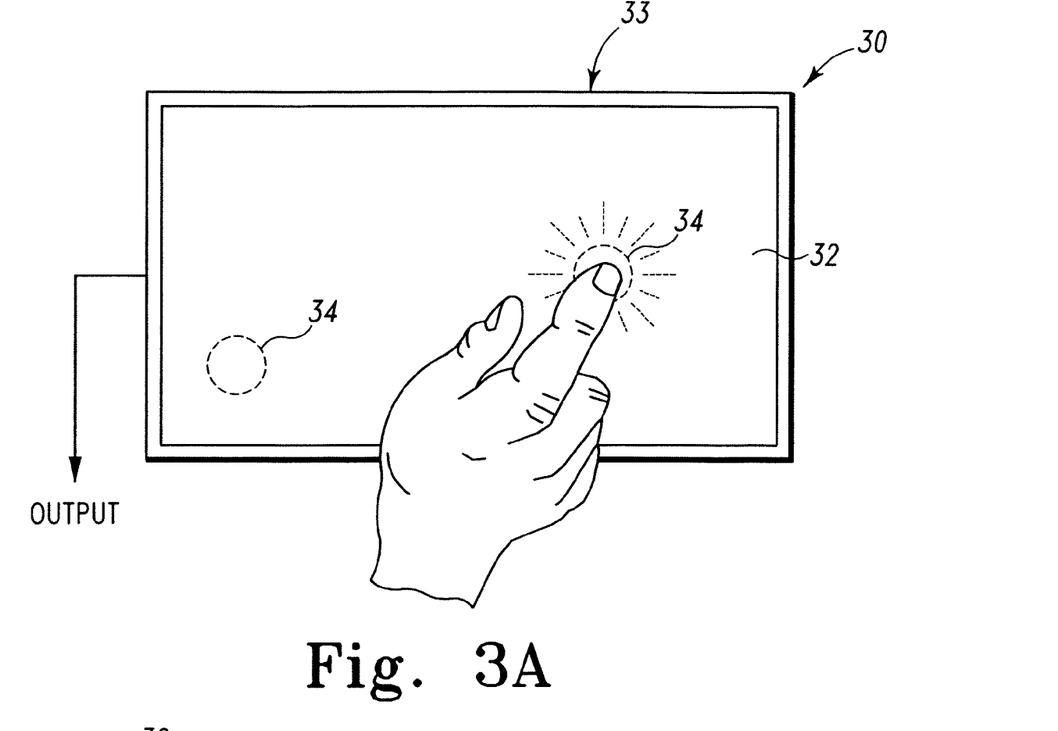
FIG. 3A depicts a control panel for a multi-dimensional control system.
Figure 3B:
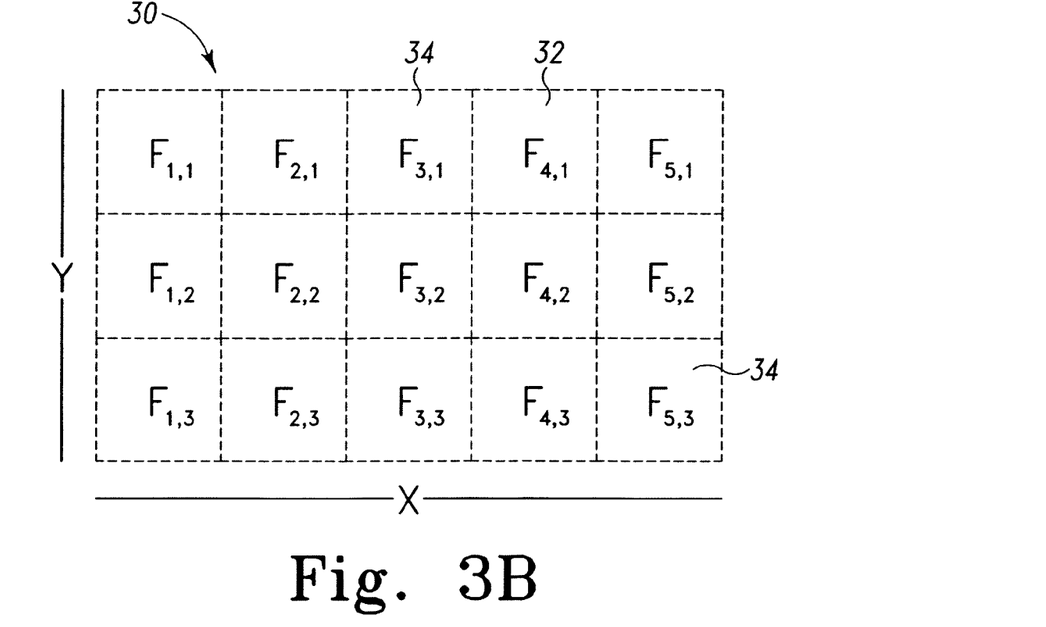
FIG. 3B is a schematic representation of a control surface for a multi-dimensional control system.
Figure 4:
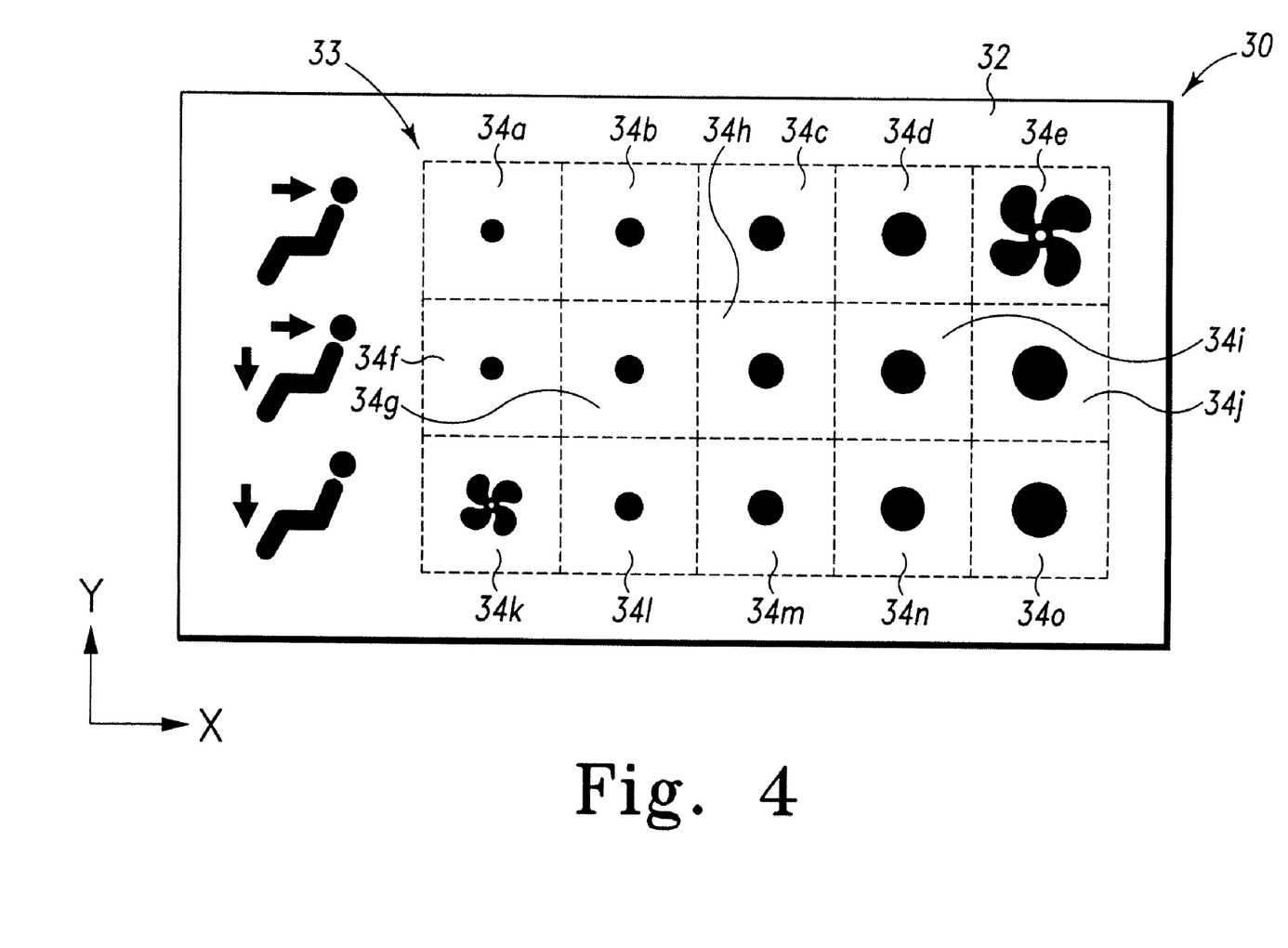
FIG. 4 depicts an HVAC control panel for a multi-dimensional control system.
Figure 5A:
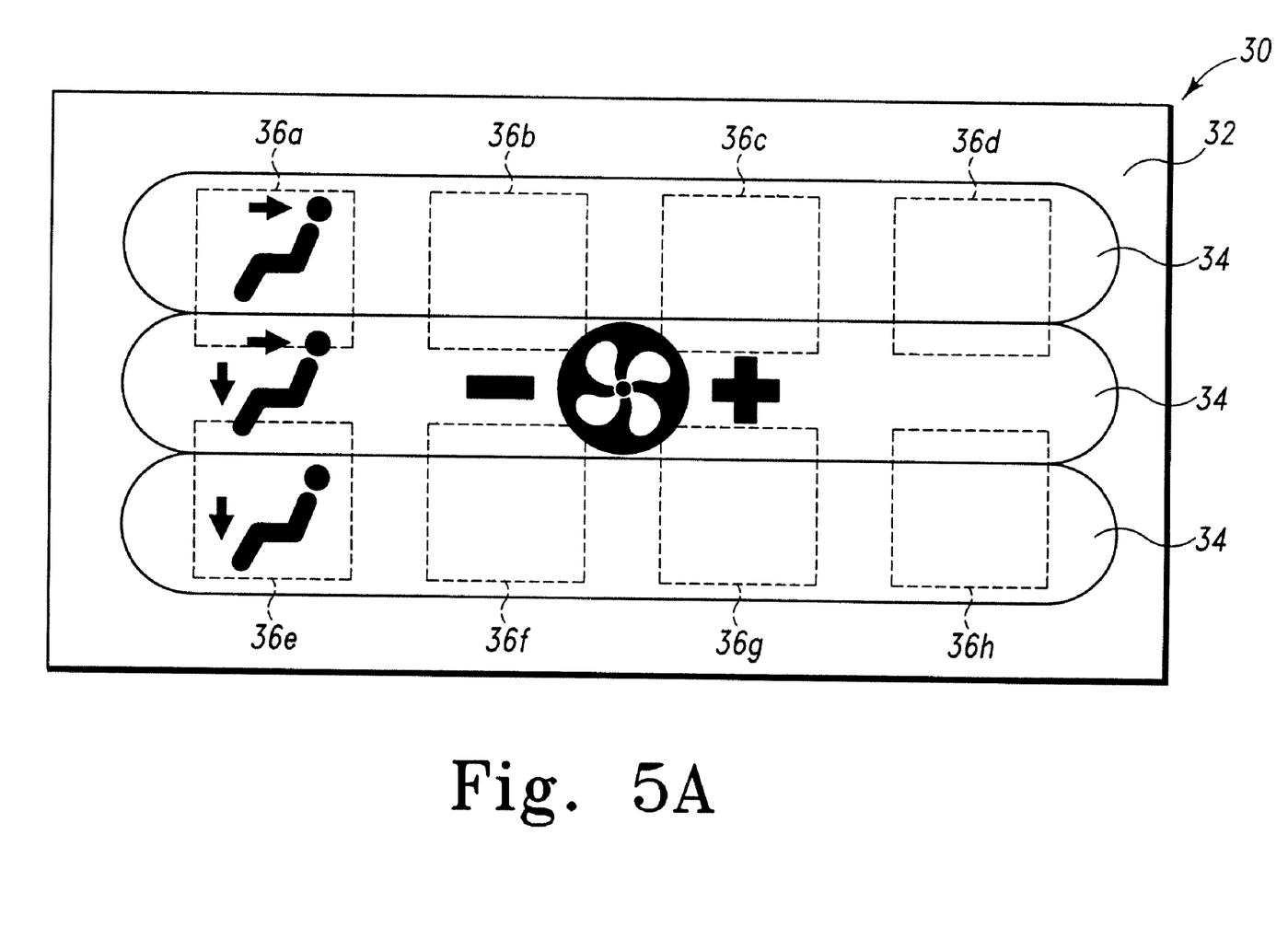
FIG. 5a depicts another HVAC control panel for a multi-dimensional control system.
Figure 5B:
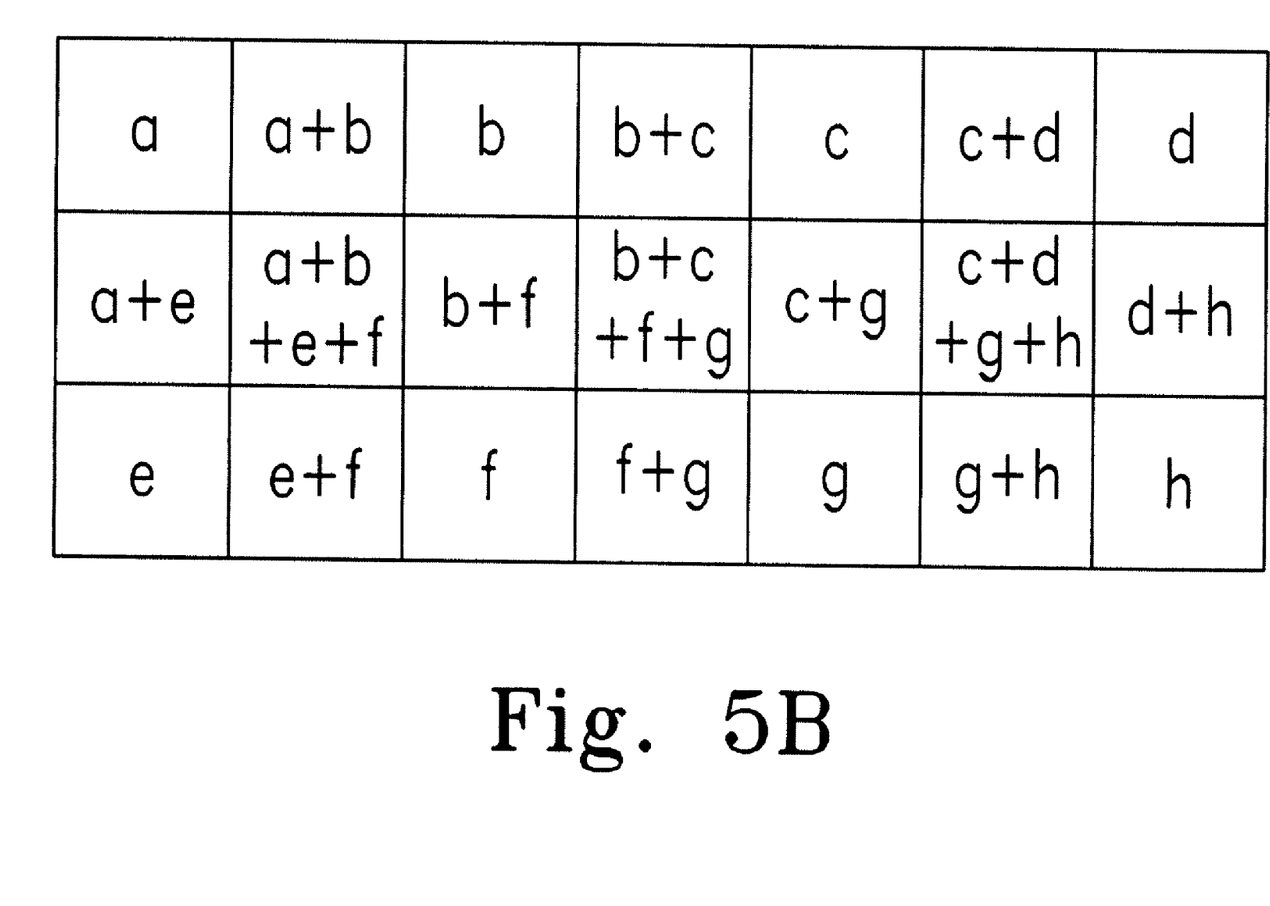

FIGS. 3-5 depict various aspects of a multi-dimensional control system. In contrast with systems that use only segregated or one-dimensional controls, the multi-dimensional control system is capable of controlling multiple device functions simultaneously. FIG. 3A shows a control panel 30 that has a control surface 32 and an input device 33 that is selectable at a plurality of positions 34 about the control surface. In the example shown in FIG. 3A, the input device is selectable by touching the control surface at any one of the positions 34. Each position 34 may be associated with at least one setting for a first device function and at least one setting for a second device function. Accordingly, when a user touches the control device at one of the various positions 34, the input device can detect the input position and the control panel 30 can output the settings associated with that position to the device or devices that perform the respective functions.

The input device 33 may comprise one or more conventional or advanced mechanical and/or electronic hardware controls. For example, the input device 33 may comprise one or more rotary dials and/or push-button controls. In another example, the input device 33 may comprise two or more proximity sensors that are arranged to form a plurality of touch-sensitive positions or control inputs 34 on the control surface 32. The sensors are activated simply by touching predetermined positions about the control surface 32.

Examples of suitable proximity sensors include, but are not limited to, capacitive, infrared, electric field, acoustic, ultrasonic, and electromagnetic sensors. In addition, Hall-effect sensors, such as the TouchCel™ Field-Effect sensor manufactured by TouchSensor Technologies, LLC of Wheaton, Ill., may be used and are preferable, for example in applications where capacitive signals from other applications would interfere or make it difficult to tune a capacitive field.

FIG. 3B is a schematic representation of a control surface 32 for a control panel 30. The control surface 32 is disposed in two dimensions, an x-dimension and a y-dimension, and may have a generally planar or any other curved or complex shape according to engineering and aesthetic requirements. The control surface 32 is divided into a plurality of discrete regions, each designated by a coordinate $F_{x,y}$, where x represents a position on the control surface in the x-dimension and y represents a position on the control surface in the y-dimension.

An input device (not shown) may be provided that includes a plurality of selectable control inputs 34 disposed at various coordinates $F_{x,y}$ of the control surface 32. One or more control inputs 34 may be provided at each coordinate $F_{x,y}$ or at fewer than all of the coordinates. Each control input 34 may be associated with at least one setting for a first function and at least one setting for a second function, as described above.

FIG. 4 depicts an example of an HVAC control panel 30 for simultaneously adjusting the fan speed and vent configuration in a climate control system. The control panel 30 comprises a control surface 32 and an input device 33 having a plurality of selectable control inputs 34a-o arranged about the control surface. In this example, fifteen control inputs 34a-o are arranged in a 5×3 array on the surface 32 so that the fan speed settings vary in the x-dimension of the control surface and the vent configuration settings vary in the y-dimension of the control surface.

The input device 33 may comprise any conventional or advanced control hardware, as described above. For example, the input device 33 may comprise push-button controls disposed at the control inputs 34a-o. In a presently preferred example, the input device 33 comprises a plurality of proximity sensors that are arranged and configured to define touch-sensitive control inputs 34a-o on the control surface 32.

Each control input 34a-o is associated simultaneously with one of five fan speed settings and one of three vent configuration settings. For example, input 34k is associated with a low fan speed and an indirect air-flow vent configuration. Input 34e, on the other hand, is associated with a high fan speed and a direct air-flow vent configuration. The control inputs 34a-o are arranged so that when the control panel 30 is installed in a vehicle, the associated fan speed settings vary horizontally (e.g., in the x-dimension) and the associated vent configuration settings vary vertically (e.g., in the y-dimension).

The control panel 30 depicted in FIG. 4 is easier to operate and more intuitive than conventional panels with one-dimensional controls. For example, the control inputs are ordered so that the fan speed increases from left to right and the venting varies from direct to indirect airflow downwardly. To adjust the fan speed setting from low to high and the vent configuration from indirect to direct air flow, the user simply activates the upper right-hand control input 34e by touching the corresponding position on the control surface 32. The control panel 30 outputs the fan and vent configuration settings simultaneously and, therefore, both functions can both be controlled with a single touch. In contrast, the control panels depicted in FIGS. 2A and 2B require successive manipulation of multiple controls.

FIG. 5a depicts another HVAC control panel 30 with a multi-dimensional control. The control panel 30 has an input device 33 and a plurality of control inputs 34 disposed about a control surface 32 of the control panel. In this example, the input device 33 comprises eight proximity sensors 36a-h arranged in a 4×2 array. The control panel 30 may be configured so that the input device 33 only detects signals from one sensor at a time. Accordingly, the control panel will have, at most, eight control inputs. Alternatively, the control panel 30 may be configured so that the input device can detect signals from multiple sensors at the same time. FIG. 5B illustrates a sensor control strategy whereby eight sensors 36a-h can be utilized in various combinations to yield 21 distinct sensing regions arranged in a 7×3 array (one region for each sensor (8), one region for intersections of two adjacent sensors (10), and one region for intersections of four adjacent sensors (3)).

A method for simultaneously controlling multiple functions in a motor vehicle will now be described with reference to the example shown in FIG. 4 and described above. The method includes one or more of the following steps: (1) providing a control panel 30 having a control surface 32 and an input device 33 having a plurality of control inputs 34a-o disposed about the control surface; (2) for each control input 34a-o, associating one of a plurality of first function settings and one of a plurality of second function settings; (3) selecting one of the control inputs; and (4) simultaneously outputting the settings associated with the selected control input to one or more devices that perform the first and second functions.

Throughout this specification various indications have been given as to preferred and alternative embodiments of the invention. However, it should be understood that the invention is not limited to any one of these. It is therefore intended that the foregoing detailed description be regarded as illustrative rather than limiting, and that it be understood that it is the appended claims, including all equivalents, that are intended to define the spirit and scope of this invention.

The invention claimed is:

1. A multi-dimensional control system for simultaneously controlling multiple device functions in a motor vehicle, the system comprising:
a control panel having a control surface; and
an input device selectable at a plurality of positions about the control surface, wherein each position is simultaneously associated with at least one of a plurality of first function settings and at least one of a plurality of second function settings;
wherein the control panel outputs the first and second function settings simultaneously with a selection of one of the plurality of positions.

2. The system of claim 1, wherein the associated first function settings vary in a first dimension of the control surface and the associated second function settings vary in a second dimension of the control surface.

3. The system of claim 1, further comprising at least one output device that performs the first and second functions, wherein the control panel is in electronic communication with the at least one output device.

4. The system of claim 1, wherein the first function has an m number of settings, the second function has an n number of settings, and the input device is selectable at an m×n number of positions.

5. The system of claim 1, wherein the input device comprises a plurality of proximity sensors.

6. The system of claim 5, wherein at least one selectable position on the control surface is associated with two or more proximity sensors.

7. The system of claim 1, wherein the first and second functions are climate control system functions.

8. The system of claim 7, wherein one of the first and second functions is fan speed.

9. The system of claim 8, wherein the other of the second and first functions is vent configuration.

10. The system of claim 1, further comprising any two or more of the following:
at least one output device that performs the first and second functions, wherein the control panel is in electronic communication with the at least one output device;
the associated first function settings vary in a first dimension of the control surface and the associated second function settings vary in a second dimension of the control surface;
the first function has an m number of settings, the second function has an n number of settings, and the input device is selectable at an m×n number of positions;
the input device comprises a plurality of proximity sensors;
at least one selectable position on the control surface is associated with two or more proximity sensors;
the first and second functions are climate control system functions;
one of the first and second functions is fan speed; and
the other of the second and first functions is vent configuration.

11. A multi-dimensional control system for simultaneously controlling multiple device functions in a motor vehicle, the system comprising:
a control panel having a control surface; and
an input device having a plurality of selectable control inputs arranged about the control surface, wherein each of the control inputs is simultaneously associated with at least one of a plurality of first function settings and at least one of a plurality of second function settings;
wherein the control panel outputs the first and second function settings simultaneously with a selection of one of the plurality of positions.

12. The control panel of claim 11, wherein the associated first function settings vary in a first dimension of the control surface and the associated second function settings vary in a second dimension of the control surface.

13. The control panel of claim 11, further comprising at least one output device that performs the first and second functions, wherein the control panel is in electronic communication with the at least one output device.

14. The system of claim 11, wherein the first function has an m number of settings, the second function has an n number of settings, and the control panel comprises an m×n number of control inputs.

15. The system of claim 14, wherein the control inputs are arranged in an m×n array about the control surface.

16. The control panel of claim 11, further comprising a plurality of proximity sensors that define the control inputs.

17. The control panel of claim 16, wherein at least one control input is defined by two or more proximity sensors.

18. The control panel of claim 11, further comprising any two or more of the following:
- the associated first function settings vary in a first dimension of the control surface and the associated second function settings vary in a second dimension of the control surface;
- at least one output device that performs the first and second functions, wherein the control panel is in electronic communication with the at least one output device;
- the first function has an m number of settings, the second function has an n number of settings, and the control panel comprises an m×n number of control inputs;
- the control inputs are arranged in an m×n array about the control surface;
- a plurality of proximity sensors that define the control inputs; and
- at least one control input is defined by two or more proximity sensors.

* * * * *